United States Patent
Lund-Laverick et al.

(10) Patent No.: US 11,577,475 B2
(45) Date of Patent: Feb. 14, 2023

(54) WIND TURBINE BLADE AND A METHOD OF MANUFACTURING THE WIND TURBINE BLADE

(71) Applicant: LM WIND POWER INTERNATIONAL TECHNOLOGY II APS, Kolding (DK)

(72) Inventors: Michael Lund-Laverick, Kolding (DK); Klavs Jespersen, Kolding (DK); Kristian Lehmann Madsen, Fredericia (DK); Karsten Schibsbye, Fredericia (DK)

(73) Assignee: LM WIND POWER INTERNATIONAL TECHNOLOGY II APS, Kolding (DK)

( * ) Notice: Subject to any disclaimer, the term of this patent is extended or adjusted under 35 U.S.C. 154(b) by 292 days.

(21) Appl. No.: 16/643,643

(22) PCT Filed: Sep. 4, 2018

(86) PCT No.: PCT/EP2018/073730
§ 371 (c)(1),
(2) Date: Mar. 2, 2020

(87) PCT Pub. No.: WO2019/043248
PCT Pub. Date: Mar. 7, 2019

(65) Prior Publication Data
US 2020/0208605 A1 Jul. 2, 2020

(30) Foreign Application Priority Data
Sep. 4, 2017 (EP) .................. 17189244

(51) Int. Cl.
*F03D 1/06* (2006.01)
*B29C 70/30* (2006.01)
(Continued)

(52) U.S. Cl.
CPC ............ *B29C 70/30* (2013.01); *F03D 1/0683* (2013.01); *B29K 2105/0872* (2013.01); *B29L 2031/085* (2013.01)

(58) Field of Classification Search
CPC .... F03D 1/0633; F03D 1/0641; F03D 1/0675; F03D 1/0683; F05B 2280/6003;
(Continued)

(56) References Cited

U.S. PATENT DOCUMENTS 5,755,558 A 5/1998 Reinfelder et al.
9,599,094 B2 * 3/2017 Dahl ....................... B29C 70/48
(Continued)

*Primary Examiner* — Justin D Seabe
*Assistant Examiner* — Sang K Kim
(74) *Attorney, Agent, or Firm* — Nath, Goldberg & Meyer; Jerald L. Meyer; Tanya E. Harkins

(57) ABSTRACT

This invention relates to a wind turbine blade component, a method of manufacturing such a wind turbine blade component and a wind turbine blade comprising the wind turbine blade component. The wind turbine blade component comprising a stack of layers arranged in a first group and in a second group, wherein the layers of each group has the same width. The layers of each group is continuously offset in an edgewise direction to form a tapered edge profile. The first group of layers may be arranged relative to the second group, or in an alternating order. The layers of the first group may further have a first length which is greater than a second length of the layers of the second group.

18 Claims, 7 Drawing Sheets

(51) Int. Cl.
*B29K 105/08* (2006.01)
*B29L 31/08* (2006.01)

(58) Field of Classification Search
CPC ............. F05B 2280/6013; B29C 70/30; B29K 2105/0872; B29L 2031/085
See application file for complete search history.

(56) References Cited

U.S. PATENT DOCUMENTS

| | | | |
|---|---|---|---|
| 10,786,952 B2 * | 9/2020 | Bech | F03D 1/0675 |
| 2012/0009070 A1 | 1/2012 | Bech | |
| 2014/0119936 A1 * | 5/2014 | Dahl | B29C 70/021 |
| | | | 264/263 |
| 2020/0300216 A1 * | 9/2020 | Girolamo | F03D 1/065 |

* cited by examiner

WIND TURBINE BLADE AND A METHOD OF MANUFACTURING THE WIND TURBINE BLADE

This is a National Phase Application filed under 35 U.S.C. 371 as a national stage of PCT/EP2018/073730, filed Sep. 4, 2018, an application claiming the benefit of European Application No. 17189244.1, filed Sep. 4, 2017, the content of each of which is hereby incorporated by reference in its entirety.

TECHNICAL FIELD

The present invention relates to a wind turbine blade component for a wind turbine blade, the wind turbine blade component comprises a plurality of layers of fibre material, wherein said plurality of layers comprises a first group of layers and at least a second group of layers.

The present invention also relates to a wind turbine blade comprising such a wind turbine blade component, and a method of manufacturing the wind turbine blade component.

BACKGROUND

It is known to integrate the spar caps or main laminates into the blade shell of the wind turbine blade during the manufacturing process. Alternatively, the main laminates may be attached to the blade shell in a post-moulding process. The main laminates are interconnected via one or more shear webs, I-beams or box beams. It is further known that the main laminates comprise a laminated stack of one or more fibre materials infused with a suitable resin and finally cured.

US 2011/0243750 A1 discloses a spar cap formed by a stack of individual layers of a fibre material which are cut into individual lengths and arranged to form a stack having a tapered end profile in the lengthwise or longitudinal direction. The individual layers are further cut to form a uniform lengthwise profile with a constant width, or to form a tapered lengthwise profile where the width tapers from the blade root to the tip end.

US 2012/0082554 A1 discloses at least two stack portions each comprising a plurality of individual layers having a uniform width in a lengthwise direction. The individual stack portions are jointed together in the lengthwise direction to form the spar cap. In one embodiment, the layers in each stack portion are individually offset relative to each other to form a zig-zag shaped end profile which extends uniformly in an edgewise direction. In an alternative embodiment, one or more fingers project from the opposite facing ends of each layer of each stack portion in the lengthwise direction. The opposite facing fingers form an overlapping finger joint extending in the edgewise direction.

This solution provides a complex joint which requires an accurate alignment and lay-up of each stack portion.

US 2009/0169392 A1 discloses a spar cap formed by a trapezoid stack of individual layers where the width of each layer tapers from one side to the opposite side. In an alternative embodiment, the stack comprises a plurality of layers of the same width divided into two groups which are offset in opposite edgewise directions to a relative wide rectangular shaped cross-sectional profile. Each group partly overlap the inclined end surface of an adjacent core element so that the overlapping edges of that group form an edge profile extending substantially perpendicular to the inclined end surface. The opposite edges of that group form an edge profile extending parallel to the thickness direction. Wrinkles are formed in the overlapping portions of the layers due to the angular transition between the outer skin of the blade shell and the tapered end of the core element. Furthermore, relative large recesses are formed in the inner blade surface as the spar cap only extends partly along the tapered end of the core element.

U.S. Pat. No. 5,755,558 A discloses a stacked spar structure comprising one group of a high modulus UD fibre material and another group of a low modulus US fibre material, wherein the layers in each group are offset in the same edgewise direction. Each group of layers has a layer width that differs from the layer width of the adjacent groups.

US 2012/0009070 A1 discloses a wind turbine blade shell comprising a plurality of precured shell elements arranged in at least two separate layers. The shell elements in each layer is angled in different edgewise directions.

OBJECT OF THE INVENTION

An object of the invention is to provide a wind turbine component, a wind turbine blade and a method that solves the abovementioned problems.

Another object of the invention is to provide a wind turbine component, a wind turbine blade and a method that saves fibre materials and reduces manufacturing costs.

Yet another object of the invention is to provide a wind turbine component, a wind turbine blade and a method that allows for a fast and simple lay-up of the fibre material.

DETAILED DESCRIPTION OF THE INVENTION

An object of the invention is achieved by a wind turbine blade component for a wind turbine blade, the wind turbine blade component extending from a first end to a second end in a lengthwise direction and further from a first edge to a second edge in an edgewise direction, the wind turbine blade component comprises a plurality of layers of fibre material arranged in a stack extending in a thickness direction, wherein the stack defines a first side and a second side where the first and second edges are arranged between the first and second sides, said plurality of layers comprises a first group of layers and at least a second group of layers, the layers of said first group has a first local width and the layers of said second group has a second local width, wherein the layers of at least one of said first and second groups are continuously offset in at least one edgewise direction from the first side to the second side, where the layers of said first group are offset in a first edgewise direction to form a first edge profile and the layers of said second group are offset in a second edgewise direction to form a second edge profile, characterised in that the first edgewise direction is opposite of the second edgewise direction.

This provides a wind turbine blade component with an alternative stacked configuration that allows for a simplified lay-up process. The stack may advantageously be formed using a reduced number of rolls with different widths of a fibre material compared with conventional methods. This also reduces the amount of cutting required as all layers in each group have the same width. Any adjustments in width may thus be performed in a common step for all layers of a selected group. The layers may also be pre-cut into the desired width and provided on rolls. This further reduces the total number of item numbers required for manufacturing the wind turbine blade components. This allows for an optimised usage of structural materials to minimise wind turbine blade mass and cost.

The wind turbine blade component is formed as a main laminate which may be integrated into the aerodynamic part of the blade shell during manufacturing, or manufactured separately and later attached to the aerodynamic part of the blade shell. The wind turbine blade component has a length measured between a first end and a second end in a lengthwise direction, a width measured between a first edge and a second edge in an edgewise direction, and a thickness measured between a first side and a second side in a thickness direction. The shape and dimensions of the wind turbine blade component may be adapted to the aerodynamic profile and/or the geometric dimensions of the wind turbine blade.

The wind turbine blade component is formed by a plurality of individual layers, e.g. plies, of a fibre material arranged in a stacked configuration. The individual layers are divided into two or more groups each comprising a plurality of layers. For example, each group comprises two, three, four, five, six, seven or more layers. The individual layers in each group have a local length, a local width and a local thickness. The number of layers in each group may be uniform, or vary relative to each other. The total number of groups may be selected dependent on the desired structural stiffness and profile of the wind turbine component.

The individual layers in at least one group are continuously offset in one edgewise direction from one side to the opposite side. The width offset of each layer may be determined relative to a reference layer, i.e. a selected layer within that group or within another group. For example, the relative width offset may increase uniformly from the first side to the second side, or vice versa. For example, the relative width offset may vary between the first and second sides. The individual first edges of the layers together form a first edge profile and the individual second edges of the layers together form a second edge profile. The first and second edge profiles may face in the same overall edgewise direction or in opposite edgewise directions. This reduces the formation of wrinkles in the fibre material and allows the respective edge profiles to match the corresponding end profiles of the adjacent core elements so that the wind turbine component and the core elements form a substantial continuous or smooth transition at the inner blade surface. This also provides an improved interface between the wind turbine blade component and the aerodynamic part of the wind turbine blade.

Offsetting the individual layers form a tapered joint defining a gradual transition between the wind turbine blade component and the adjoining core element. This provides an optimal transition in stiffness and lowers stress concentrations in this tapered joint.

Further, the layers of said first group are offset in a first edgewise direction to form a first edge profile and the layers of said second group are offset in a second edgewise direction to form a second edge profile.

Preferably, the stack comprises a first group of layers and at least a second group of layers. The number of layers in the first and second groups may vary or be the same. The individual layers in the first group may be offset in a first edgewise direction so that the individual first or second edges together form a first edge profile. The individual layers in the second group may be offset in a second edgewise direction relative to the first edgewise direction so that the individual first or second edges together to form a second edge profile. The stack may optionally comprise further groups where the individual layers in these further groups may be offset in a further edgewise direction that differs from the first and second edgewise directions.

The relative width offset of the first group and/or of the second group may be selected dependent on the aerodynamic profile and geometrical dimensions of the wind turbine blade. For example, the relative width offset of the first group may be equal to the relative width offset of the second group. The first and second edge profiles may thus be angled equally or symmetrical relative to the thickness direction. For example, the relative width offset of the first group may differ from the relative width offset of the second group. The first and second edge profiles may thus be angled differently relative to the thickness direction. This allows the respective edge profiles to form a tapered joint with a relative short or long transition measured in the edgewise direction.

Further, the first edgewise direction is opposite of the second edgewise direction. Alternatively, the first edgewise direction is equal to the second edgewise direction.

The individual layers of the first group and of the second group may be offset in opposite edgewise directions so that the wind turbine blade component may form a zig-zag shaped edge profile. Here, the zig-zag profile may be defined by the combined first edge profiles or second edge profiles of the above groups. This allows the respective edge profiles to form a relative short tapered joint with two tapered edge portions, e.g. a substantially V-shaped joint.

Alternatively, the individual layers of the first group and of the second group may also be offset in the same edgewise direction so that the individual first or second edge profiles may extend parallel relative to each other or in different angular positions. The individual layers of the first and second groups may both be offset relative to the same starting point, i.e. the reference layers may be aligned. This allows the respective edge profiles to form an alternative tapered joint with two tapered edge portions, e.g. a stepped or sawtooth shaped joint.

The individual layers of the first and second groups may also be offset relative to different starting points, i.e. the reference layers may be offset. The first side may thus be formed by the combined first outermost layers of the first and second groups and the second side may thus be formed by the combined second outermost layers of the first and second groups. This allows the respective outermost layers to form a side with a combined total width greater than the local width of each outermost layer.

Alternatively, the individual layers of the first group and of the second group may also be continuously offset in the same edgewise direction so that the width offset is continuously increased in the thickness direction. The individual first or second edge profiles may thus a continuous edge surface with different angular portions. This allows the respective edge profiles to form a relative long tapered joint with a single tapered edge portion.

According to one embodiment, an outermost layer of said first group is aligned with an outermost layer of said second group in the thickness direction.

The first group may comprise a first outermost layer facing the first side and a second outermost layer facing the second side. This first or second outermost layer may be used as reference for offsetting the other layers of the first group. Similarly, the second group may comprise a first outermost layer facing the first side and a second outermost layer facing the second side. This first or second outermost layer may be used as reference for offsetting the other layers of the second group.

The reference layer of the first group may be aligned with the reference layer of the second group in the thickness direction. Alternatively, the two reference layers may be offset relative to each other in the edgewise direction. For example, the first or second outermost layers of the first and second groups may be used as reference layers. This allows an outermost layer of the first group to partly or fully overlap an adjacent outermost layer of the second group in the edgewise direction, or vice versa.

Further, a local width offset between the reference layer and a selected layer in the first group may be equal to or differ from a local width offset between corresponding layers in the second group. For example, the local width offsets between the first and second outermost layers of the first group and of second group may be the same. The same may apply to any other corresponding layers between the first and second groups.

According to one embodiment, the layers of the second group are offset relative to an outermost layer of the first group.

Alternatively, the first or second outermost layer of the first group may be used as the reference layer for offsetting the layers of the second group. This reference layer may thus be partly overlapped by an adjacent outermost layer of the second group. Optionally, this adjacent outermost layer may further be aligned with the reference layer used for offsetting the layers of the first group. Thereby, forming a greater relative width offset between these two adjacent outermost layers of the first and second groups.

According to one embodiment, the layers of at least the first or second group are arranged in a continuous order in the thickness direction.

The individual layers of the first group may be arranged in a continuous order along the thickness of the stack. Further, the individual layers of the second group may be arranged in a continuous order along the thickness of the stack. The first and second groups may thus be arranged adjacent to each other. This allows the layers of each group to be laid up in a continuous process.

According to one embodiment, the layers of the first group and the layers of the second group are arranged in an alternating order in the thickness direction.

The individual layers of the first group and the individual layers of the second group may instead be arranged in an alternating order along the thickness of the stack. This allows the layers of the first and second groups to be laid up in an alternating process.

According to one embodiment, said plurality of layers form a tapered stack, wherein a total width of said tapered stack tapers from the first side to second side or a total thickness of said tapered stack tapers from a layer defining one of said first and second sides to a layer defining the other of said first and second sides.

The total number of individual layers defining the stack may be arranged to form a tapered profile extending in the edgewise direction and in the thickness direction. This tapered profile may define a total width and a total thickness of the wind turbine blade component. For example, but not limited to, the stack may comprise at least ten layers, preferably between twenty and eighty layers.

For example, the individual layers of the first and second groups may be arranged to form a substantially uniform cross-sectional profile having a substantial uniform total width along the thickness of the wind turbine blade component. For example, this uniform cross-sectional profile may be shaped as a parallelogram. The total thickness of the wind turbine blade component may taper in the edgewise direction from a layer defining the first side to a layer defining the second side, or vice versa. Here, the 'parallelogram' is defined as any geometrical shape having parallel first and second sides and parallel first and second edges. This allows for a substantially uniform overlap between adjacent layers in the stack.

For example, the individual layers of the first and second groups may be arranged to form a trapezoid shaped cross-sectional profile where the total width may taper along the thickness of the wind turbine blade component from the first side to the second side, or vice versa. Here, the 'trapezoid' is defined as any geometrical shape having parallel first and second sides and non-parallel first and second edges.

This tapered stack may form a sub-part of a larger overall tapered stack of the wind turbine blade component. A third group of layers and a fourth group of layers may be arranged to form at least another sub-part of this overall tapered stack. Said another sub-part may be positioned at the first or second side of the above first and second groups of layers. The individual layers of the third and fourth groups may each have a local width which differs from the local width of the first and/or second group of layers. For example, the layers of the third and/or fourth group may have a width greater or smaller than the width of the layers of the first and/or second group. Further, the layers of the first and second groups may be arranged in an alternating order and/or the layers of the third and fourth groups may be arranged in an alternating order. This allows the local width of the individual layers in each sub-part to be adapted to the overall total thickness of this wind turbine blade component. This also allows for the manufacture of relative thick wind turbine blade components or wind turbine blade components with a relative long edgewise transitional area.

Alternatively, the individual layers of the first and second groups may be arranged to form one half of a symmetrical profile of the wind turbine blade component where the other half of this symmetrical profile may be formed by a transformed copy of the first and second groups. The transformed copy may be formed by rotation, scaling, reflection or any combinations thereof. The total width of this wind turbine blade component may taper along the thickness of the wind turbine blade component from a centreline to the first side and/or to the second side. Thus, a maximum overlap between adjacent layers may be located towards the first or second side while a minimum overlap between adjacent layers may be located towards the centreline.

According to one embodiment, said first local width is equal to said second local width, or said first local width differs from the second local width.

The individual layers in the first group may each have a first width, a first length and a first thickness. Further, the individual layers in the second group may each have a second width, a second length and a second thickness.

The layers of both the first and second groups may have the same local width, i.e. the first width may be equal to the second width. Alternatively, the layers of the first group and the layers of the second group may have different local widths, i.e. the first width is greater or smaller than the second width. This allows the local width of the layers in each group to be adapted to the aerodynamic profile and geometrical profile of the wind turbine blade.

According to one embodiment, the layers of said first group further have a first local length and the layers of said second group further have a second local length, wherein either said first local length is equal to said second local length or said first local length differs from the second local length.

The individual layers of at least one group may be aligned at the first end or at the second end. Alternatively, the individual layers may be continuously offset in one lengthwise direction relative to a reference layer. The length offset of each layer may be determined relative to the above reference layer or another reference layer. For example, the relative length offset may increase uniformly or vary from the first side to the second side, or vice versa. The individual first ends and the individual second ends of these layers may together each form a tapered end profile facing in the same lengthwise direction. Thereby, forming another tapered joint between the wind turbine blade component and an adjacent part of the blade shell. This further reduces the risk of wrinkles forming in the laminated layers during manufacture and further reduces the risk of delamination in the tapered joints. This also allows the total thickness of the wind turbine blade component to taper off, e.g. in steps or gradually, in the lengthwise direction towards the tip end and/or the blade root.

The individual layers of first group and the individual layers of the second group may each have the same local length, i.e. the first length may be equal to the second length. Alternatively, the layers of the first group and the layers of the second group may have different local lengths, i.e. the first length may be greater or smaller than from the second length. This allows the local length of the layers of each group to be adapted to the aerodynamic profile and geometrical profile of the wind turbine blade.

In a special configuration, the layers of the first group may have a first length extending beyond the second length of the layers of the second group. The layers of the second group may further have a second width extending beyond the first width of the first group. Optionally, layers of a third group may have a third length extending less than the second length and may further have a third width extending beyond the second width. This allows the wind turbine blade component to extend further into the tip end region and thus have a longer total length. This further allows the total width and/or total thickness of the wind turbine blade component to taper off, e.g. in a stepped manner, as it extends further into the tip end region.

In this special configuration, the layers of the first group, the second group and optionally the third group may further be aligned relative to a common central line in the edgewise direction or offset towards the first or second edge of the wind turbine blade component. Alternatively or additionally, the layers of the first group, the second group and optionally the third group may be aligned centrally in the lengthwise direction or offset towards the first or second end of the wind turbine blade component.

In an alternative special configuration, the layers of one or more selected groups may be offset both in the edgewise and lengthwise directions. For example, the layers of one group may be offset differently in both the edgewise and lengthwise directions relative to the layers of another group. For example, the layers of one group may be offset in both the edgewise and lengthwise directions while the layers of another group may be offset only in the edgewise direction. For example, the layers of all groups may be offset in both the edgewise and lengthwise directions.

The local thickness of the layers in each group may be the same. Alternatively, the local thickness of the layers of the first group may be smaller than the local thickness of the layers of the second group, or vice versa. This further allows the profile of the wind turbine blade component to be adapted to the aerodynamic profile and geometrical dimensions of the wind turbine blade.

An object of the invention is further achieved by a method of manufacturing a wind turbine blade component as described above, comprising the steps of:
  laying up a first group of layers of a fibre material in a mould, wherein each layer of said first group has a first local width,
  further laying up at least a second group of layers of the fibre material, wherein each layer of said at least second group has a second local width,
  infusing said fibre material with a resin,
  substantially curing said resin to form a wind turbine blade component,
  characterised in that the laying up of at least one of said first and second groups of layers comprises continuously offsetting subsequent layers of said at least one of the first and second groups of layers in one edgewise direction relative to a reference layer of said at least one of the first and second groups of layers.

This provides a simplified lay-up process of the layers forming the wind turbine blade component using a reduced number of rolls with fibre material. This also reduces the total item numbers used to manufacture the wind turbine blade component compared to conventional methods. A minimal amount of cutting is thus required to form each individual layer in that group, as any adjustment in width can be performed in a common step. The present invention also minimizes the mass and cost of the wind turbine blade by an optimised usage of structural materials during manufacturing.

The wind turbine blade component may be laid up in a separate mould and, optionally, infused with resin and then cured. The cured wind turbine blade component may then be positioned and attached to the rest of the blade shell structure in a later step. Alternatively, the wind turbine component may be laid up directly in a recess formed in a blade shell structure arranged in a blade mould.

The lay-up of the stack can thus be performed by simply offsetting the individual layers in the edgewise or chordwise direction in order to form the desired cross-sectional profile. This may be done manually by hand or via the automated lay-up equipment. In conventional methods, the roll with fibre material has to be exchanged for each layer in order to provide the tapered cross-sectional profile. The tapered cross-sectional profile may also be formed in some conventional methods by individually cutting each layer in width. The present invention enhances the infusion properties of the wind turbine blade component and provides an improved interface between the aerodynamic part and the wind turbine blade component.

According to one embodiment, at least one of said first and second groups of layers is laid up in a continuous step.

Each group of layers may be laid up in a continuous order and thus in individual continuous steps. Thereby, the first group of the layers may be laid up in a first step and the second group of layers may be laid up in a second step. This allows for fast and simple lay-up of each individual group of layers. The individual layers of each group may simply be cut in length during lay-up, or be supplied as pre-cut items. A first layer may be initially laid up and function as a reference layer for offsetting the subsequent layers. The subsequent layers may be laid up by simply offsetting them in the edgewise direction relative to the reference layer.

According to one embodiment, said first and second groups of layers are laid up in alternating order.

The first and second groups of layers may also be laid up in an alternating order and thus in a combined step.

For example, a first layer of the first group may initially be laid up in the mould and function as a first reference layer for offsetting the subsequent layers of the first group. Then, a first layer of the second group may be laid up on top of the first layer of the first group and function as a second reference layer for offsetting the subsequent layers of the second group. Optionally, this second reference layer may be offset in the edgewise direction relative to the first reference layer. A second layer of the first group may afterwards be laid up on top of the first layer of the second group and offset relative to the first reference layer. A second layer of the second group may then be laid up on top of the second layer of the first group and offset relative to the second reference layer. And so forth. This process may be repeated until all layers of the first and second groups are laid up.

For example, a first layer of the first group may initially be laid up in the mould and function as a common reference layer for offsetting the subsequent layers of the first and second groups. Then, a first layer of the second group may be laid up on top of the first layer of the first group and offset in the edgewise direction relative to this common reference layer. A second layer of the first group may afterwards be laid up on top of the first layer of the second group and offset relative to the common reference layer. A second layer of the second group may then be laid up on top of the second layer of the first group and offset relative to the common reference layer. And so forth. This process may be repeated until all layers of the first and second groups are laid up.

The subsequent layers of the first group may be continuously offset in the first edgewise direction during the lay-up. Similarly, the subsequent layers of the second group may be continuously offset in the second edgewise direction during the lay-up. The first and second edgewise directions may substantially face in opposite edgewise directions. Alternatively, each subsequent layer of the first and second groups may offset in the same overall edgewise direction, but with different width offsets, during the lay-up. Alternatively, each subsequent layer of one group may offset in one edgewise direction while each subsequent layer of the other group may be aligned in the thickness direction, i.e. have a width offset of zero, during the lay-up. This forms a stack having a trapezoid or parallelogram shaped cross-sectional profile.

According to one embodiment, the layers of a group having the greatest local length of said stack and/or the smallest local width of said stack are laid up in an initial sub-step.

The individual layers within each group may be laid up in a predetermined order, as described above.

The individual groups may be arranged so that the group of layers having the greatest local width may be laid up in the mould or recess in an initial sub-step. The group of layers having the second-greatest local width may be laid up in a subsequent sub-step on top of these layers. This process may be repeated until the group of layers having the smallest local width are laid up in the mould or recess in a final sub-step. The groups may also be laid up in a reversed order so that the narrowest layers are initially laid up while widest layers are finally laid up. The layers may thus form a stack with a tapered cross-sectional profile.

Additionally or alternatively, the individual groups may be arranged so that the group of layers having the greatest local length may be laid up in the mould or recess in an initial sub-step. The group of layers having the second-greatest local length may be laid up in a subsequent sub-step on top of these layers. This process may be repeated until the group of layers having the smallest local length are laid up in the mould or recess in a final sub-step. The groups may also be laid up in an reversed order so that the shortest layers are initially laid up while longest layers are finally laid up. The layers may thus form a stack with a tapered lengthwise profile.

According to one embodiment, at least one layer of said first group or second group is laid up in an inclined angle relative to the lengthwise direction of another layer of the first group or second group, and/or at least one layer of said first group or second group is laid up in a curved direction relative to the lengthwise direction.

In another special embodiment, one or more groups of layers may be placed in a predetermined angle relative to the lengthwise direction. Alternatively, the layers within one group may be placed in predetermined angles relative to the lengthwise direction. This angle may be measured from the first end towards the second end, or vice versa.

For example, the individual group of layers and/or layers within one group may be angled individually in relation to the lengthwise direction so that an angular offset exists between adjacent groups. At least one group or layer may extend parallel to the lengthwise direction while the other groups or layers may be placed in an uniformly increasing angle along the thickness direction. Alternatively, one group or layer may be angled towards the first edge while at least one further group or layer may be angled towards to the second edge. The angle may alternatively vary along the thickness direction. In example, but not limited to, the angular offset may 0.5°, 1°, 1.5°, 2° or even greater or even smaller. This provides an overall profile where the total width varies along the lengthwise direction.

In yet another special embodiment, one or more groups of layers may extend in a cured direction relative to the lengthwise direction. The curvature may be measured from the first end towards the second end, or vice versa.

For example, the individual groups of layers and/or the individual layers within one group may be individually curved or have the same curvature in relation to the lengthwise direction. At least one group or layer may extend parallel to the lengthwise direction while the other groups or layers may be curved towards the first or second edge. Alternatively or additionally, at least one group or layer may be curved towards the first edge while at least one other group or layer may be curved towards the second edge. This provides an overall profile suitable for twisted or pre-bend wind turbine blades.

The above curvature or angular placement may be selected dependent on the chordwise position of the wind turbine blade component and/or the aerodynamic profile of the wind turbine blade.

An object of the invention is also achieved by a wind turbine blade for a wind turbine, extending from a blade root to a tip end in a longitudinal direction and further from a leading edge to a trailing edge in a chordwise direction, the wind turbine blade comprises a blade shell forming a pressure side and a suction side and a load carrying structure arranged between the pressure side and the suction side, wherein said load carrying structure comprises at least one main laminate located at the pressure side and at least one main laminate located at the suction side, characterised in that at least one of said main laminates at the pressure and suction sides is configured as described above.

This provides a wind turbine blade with at least one main laminate arranged in the pressure side and in the suction side, respectively. Each main laminate extends in the longitudinal direction and further in the chordwise direction. The main laminates are preferably manufactured, as described earlier, and provide an improved transition between the main laminate and the aerodynamic part of the blade shell.

An outer skin comprising a number of outer layers of a fibre material may extend along the first side of the main laminate. A number of core elements and the stack of layers of the main laminate may then be arranged on this outer skin. The stack extends in the thickness direction, e.g. perpendicular to the chord or the camber line. An inner skin comprising a number of inner layers of the fibre material may extend along the second side of the main laminate. This provides a sandwich structure which may be infused with resin and finally cured. This provides an integrated main laminate structure with improved infusion properties which, in turn, reduces the risk of wrinkles forming in the laminated layers.

Alternatively, the core elements may be spaced apart to form a recess for receiving the main laminate. The inner skin may extend along the end surfaces of these adjacent core elements and further along the outer skin. The stack of layers of the main laminate may afterwards be arranged within this recess and then infused with resin and finally cured. This allows the wind turbine blade to be manufactured in a two-step process.

DESCRIPTION OF DRAWINGS

The invention is explained in detail below with reference to embodiments shown in the drawings, in which.

LIST OF REFERENCES

Figure 1:
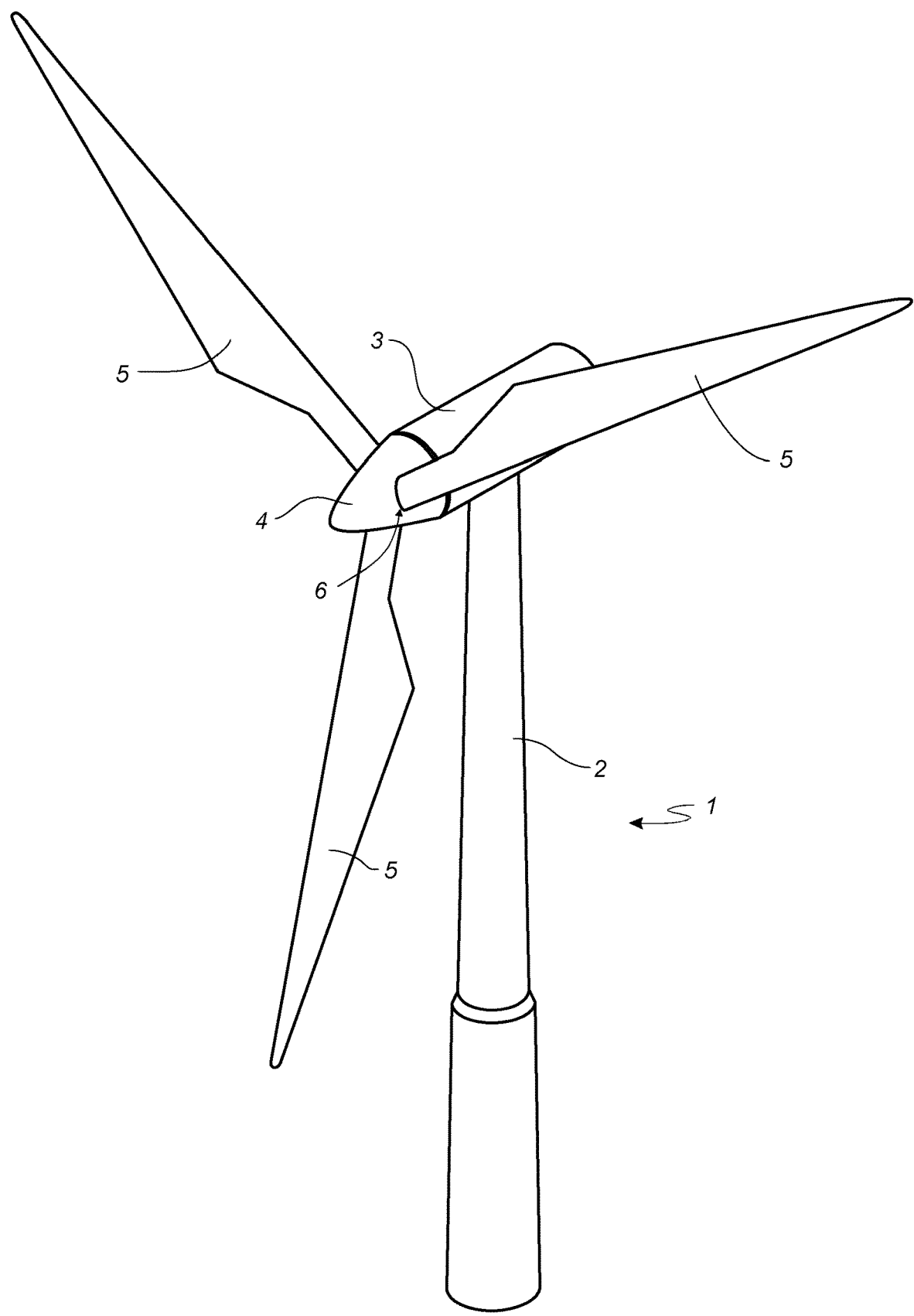
FIG. 1 shows a wind turbine.

1. Wind turbine
2. Wind turbine tower
3. Nacelle
4. Hub
5. Wind turbine blades
6. Pitch bearing
7. Blade root
8. Tip end
9. Leading edge
10. Trailing edge
11. Blade shell
12. Pressure side
13. Suction side
14. Blade root portion
15. Aerodynamic blade portion
16. Transition portion
17. Length of wind turbine blade
18. Chord length of wind turbine blade
19. Blade thickness
20. Core elements
21. Inner skin
22. Outer skin
23. Main laminate
24. First side
25. Second side
26. First edge
27. Second edge
28. End surfaces of core elements
29. Aerodynamic part of blade shell
30. First group of layers
31. Second group of layers
32. First outermost layer
33. Second outermost layer
34. Width offset
35. First edge profile
36. Second edge profile
37. Main laminate
38. Sub-parts of the main laminate
39. Halves of the main laminate
40. Central line
41. Third group of layers
42. First end
43. Second end
44. Lengthwise direction
$W_1$ First local width
$W_2$ Second local width
$W_3$ Third local width
$L_1$ First local length
$L_2$ Second local length
$L_3$ Third local length The listed reference numbers are shown in abovementioned drawings where not all reference numbers are shown on the same figure for illustrative purposes. The same part or position seen in the drawings is numbered with the same reference number in different figures.

DETAILED DESCRIPTION OF THE DRAWINGS

FIG. 1 shows a modern wind turbine 1 comprising a wind turbine tower 2, a nacelle 3 arranged on top of the wind turbine tower 2, and a rotor defining a rotor plane. The nacelle 3 is connected to the wind turbine tower 2, e.g. via a yaw bearing unit. The rotor comprises a hub 4 and a number of wind turbine blades 5. Here three wind turbine blades are shown, but the rotor may comprise more or fewer wind turbine blades 5. The hub 4 is connected to a drive train, e.g. a generator, located in the wind turbine 1 via a rotation shaft.

The hub 4 comprises a mounting interface for each wind turbine blade 5. A pitch bearing unit 6 is optionally connected to this mounting interface and further to a blade root of the wind turbine blade 5.

Figure 2:
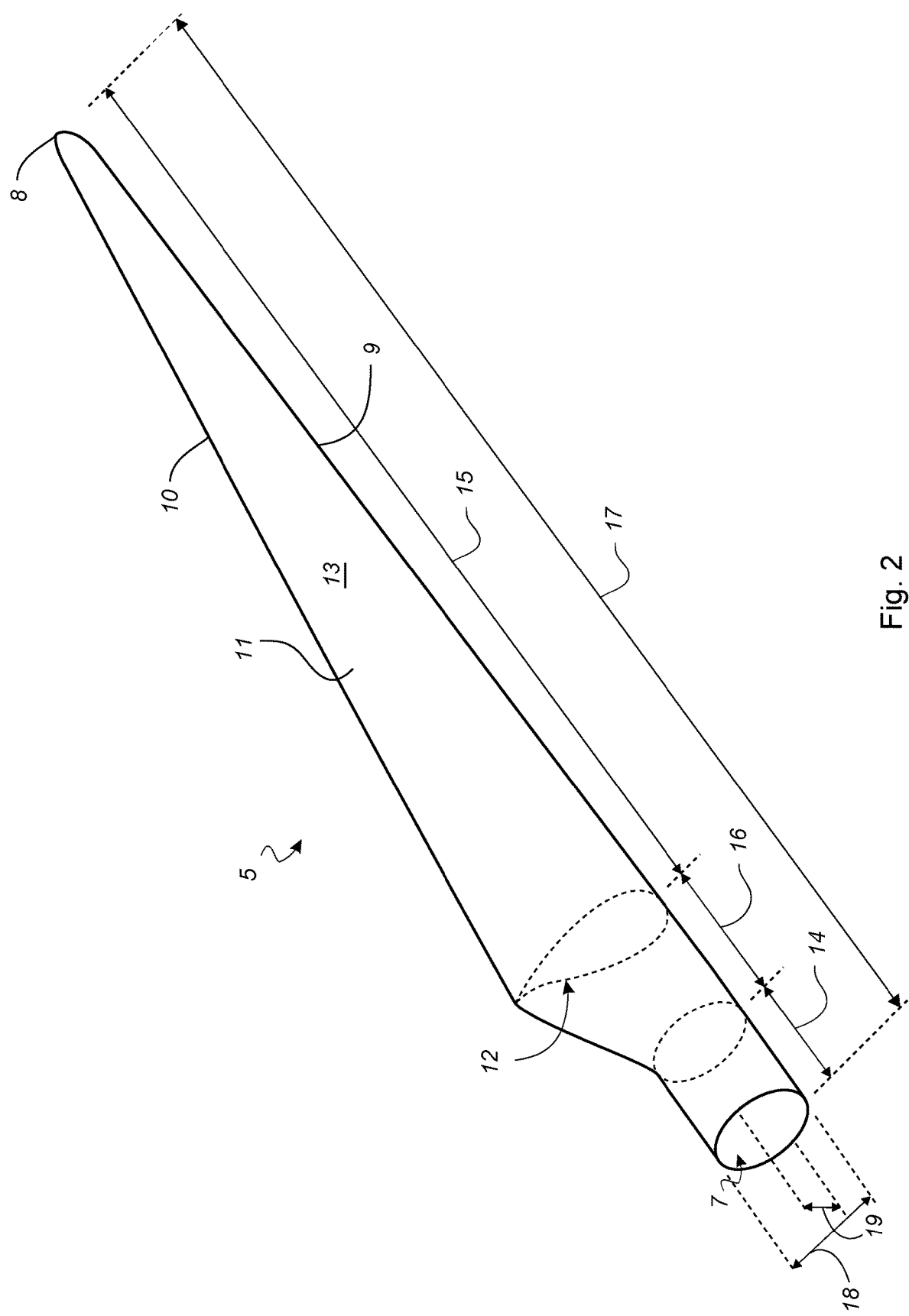
FIG. 2 shows an exemplary embodiment of the wind turbine blade.

FIG. 2 shows a schematic view of the wind turbine blade 5 which extends in a longitudinal direction from a blade root 7 to a tip end 8. The wind turbine blade 5 further extends in a chordwise direction from a leading edge 9 to a trailing edge 10. The wind turbine blade 5 comprises a blade shell 11 having two opposite facing side surfaces defining a pressure side 12 and a suction side 13 respectively. The blade shell 11 further defines a blade root portion 14, an aerodynamic blade portion 15, and a transition portion 16 between the blade root portion 14 and the aerodynamic blade portion 15.

The blade root portion 14 has a substantially circular or elliptical cross-section (indicated by dashed lines). The blade root portion 14 together with a load carrying structure, e.g. a main laminate combined with a shear web or a box beam, are configured to add structural strength to the wind turbine blade 5 and transfer the dynamic loads to the hub 4. The load carrying structure extends between the pressure side 12 and the suction side 13 and further in the longitudinal direction.

The blade aerodynamic blade portion 15 has an aerodynamically shaped cross-section (indicated by dashed lines) designed to generate lift. The cross-sectional profile of the blade shell 11 gradually transforms from the circular or elliptical profile into the aerodynamic profile in the transition portion 16.

The wind turbine blade 5 has a longitudinal length 17 of at least 35 metres, preferably at least 50 metres. The wind turbine blade 5 further has a chord length 18 as function of the length 17, wherein the maximum chord length is found between the blade aerodynamic blade portion 15 and the transition portion 16. The wind turbine blade 5 further has a blade thickness 19 as function of the chord length 18, wherein the blade thickness 19 is measured perpendicularly to the chord between the pressure side 12 and the suction side 13.

Figure 3:
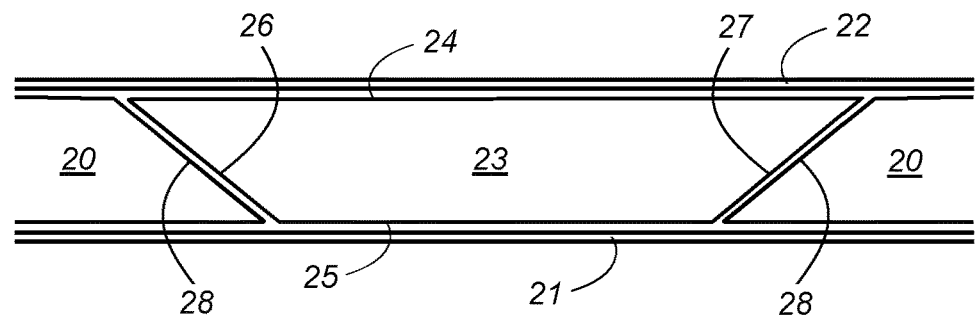
FIG. 3 shows a first embodiment of the wind turbine blade component integrated into the blade shell.

FIG. 3 shows a first embodiment of a wind turbine blade component integrated into the blade shell 11. The blade shell 11 comprises a sandwich structure with a number of core elements 20 arranged between an inner skin 21 defining an inner blade surface and an outer skin 22 defining an outer blade surface. Each skin 21, 22 includes a number of layers of a fibre material.

The wind turbine blade component is formed as a main laminate 23 joined to the core elements 20, wherein the inner and outer skins 21, 22 extend over a first side 24 and a second side 25 of the wind turbine blade component, respectively. The wind turbine blade component further comprises a first edge 26 and a second edge 27. The main laminate 23 is formed by a stack of layers extending in a thickness direction, as indicated in FIG. 6 to FIG. 14. Each edge 26, 27 form an edge profile defined by the combined local first and second edges of each layer in the stack.

Here, the main laminate 23 has a trapezoid shaped cross-sectional profile, wherein the total width of the stack tapers from the first side 24 to the second side 25 seem in the thickness direction. The first and second edges 26, 27 each form a tapered edge profile with an edge surface facing the adjacent core element 20. The adjacent core element 20 comprises an edge 28 having a tapered edge profile with an edge surface facing the main laminate 23. The opposite facing edges 26, 27, 28 together forms two tapered joints extending in opposite edgewise directions.

Figure 4:
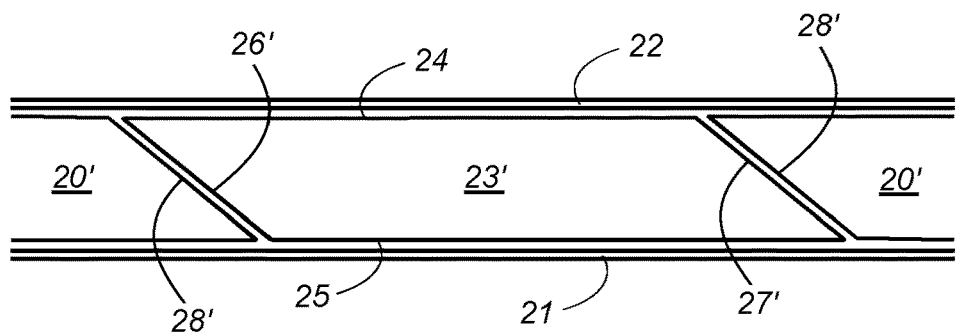
FIG. 4 shows a second embodiment of the wind turbine blade component.

FIG. 4 shows a second embodiment of the wind turbine blade component, where total thickness of the wind turbine blade component tapers from one side 24, 25 to the opposite side 24, 25 seem in one edgewise direction. Here, the main laminate 23' has a parallelogram shaped cross-sectional profile. The opposite facing edges 26', 27', 28' together forms two tapered joints extending in the same edgewise direction.

Figure 5:
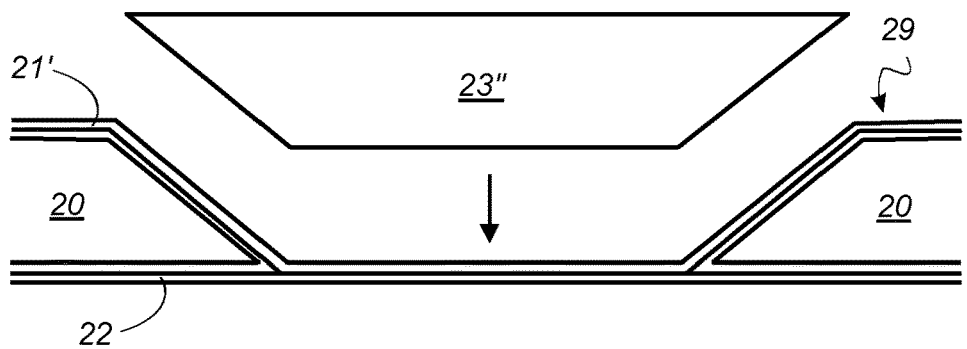
FIG. 5 shows the wind turbine blade component attached to an aerodynamic part of the blade shell.

FIG. 5 shows the wind turbine blade component attached to an aerodynamic part 29 of the blade shell 11. The core elements 20 are arranged to form a recess for receiving the main laminate 23", as illustrated. Here, the inner skin 21' extends along the core elements 20 and further along the respective edges 28 and the outer skin 22 in the recess.

The main laminate 23" is then laid up in the recess after curing of the aerodynamic part 29. Once the main laminate 23" is laid up, the main laminate 23" is infused with resin and finally cured. The main laminate 23" may also be formed as a pre-cured element which is positioned in the recess and then attached to the aerodynamic part 29.

Figure 6:
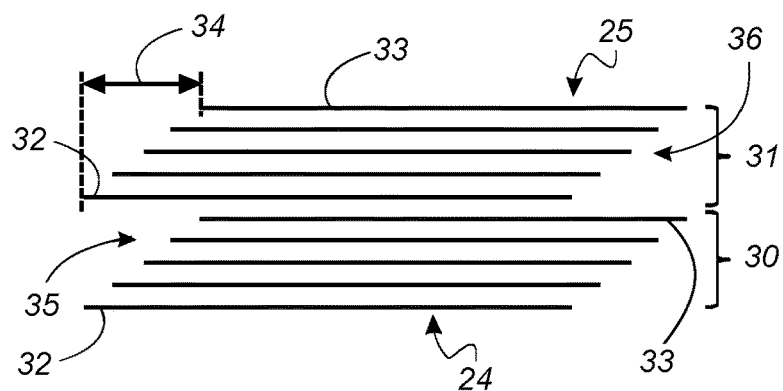
FIG. 6 shows a first embodiment of the stack comprising a first group of layers and a second group of layers arranged in a continuous order.

FIG. 6 shows a first embodiment of the stack comprising a first group 30 of layers and a second group 31 of layers arranged in a continuous order. The first and second groups 30, 31 each comprise a number of layers of a fibre material. The first and second groups 30, 31 of layers are arranged relative to each other. The stack defines a total thickness and a total width of the wind turbine blade component.

The first and second groups 30, 31 each comprise a first outermost layer 32 facing the first side 24 and a second outermost layer 33 facing the second side 25. One layer of the first group 30 functions as a reference layer for offsetting the other layers of the first group 30. Similarly, one layer of the second group 31 functions as a reference layer for offsetting the other layers of the second group 31. Here, the first outermost layers 32 of each group 30, 31 are used as the reference layers which are further aligned relative to each other in thickness direction.

The local width offset 34 of each offset layer of the first group 30 is continuously increased from the first side 24 to the second side 25, as illustrated in FIG. 6. Similarly, the local width offset 34 of each offset layer of the second group 30 is continuously increased from the first side 24 to the second side 25. Here, the local width offsets 34 in the first group 30 are equal to the local width offsets 34 in the second group 31.

The individual layers of the first group 30 forms a first edge profile 35 defined by the combined local first edges and local second edges. Similarly, individual layers of the second group 31 forms a second edge profile 36 defined by the combined local first edges and local second edges. Here, both the first and second edge profiles extend in the same edgewise direction, as illustrated in FIG. 6.

Figure 7:
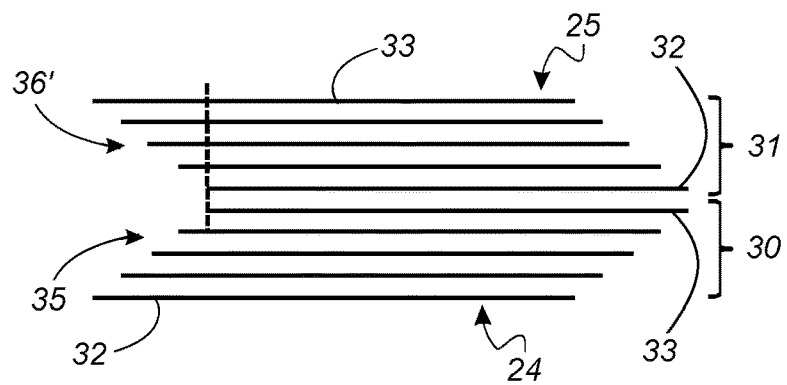
FIG. 7 shows a second embodiment of the first group and the second group.

FIG. 7 shows a second embodiment of the first group 30 and the second group 31, wherein the layers of the second group 31 are offset in an opposite edgewise direction relative to the layers of the first group 30.

Here, the first outermost layer 32 of the second group 31 functions as the reference layer. The first outermost layer 32 of the second group 31 is further aligned in the thickness direction with the second outermost layer of the first group 30.

The local width offsets 34 in the first group 30 are equal to the local width offsets 34 in the second group 31, but in different directions. The first and second edge profiles 35, 36' thus extend in opposite edgewise directions.

Figure 8:
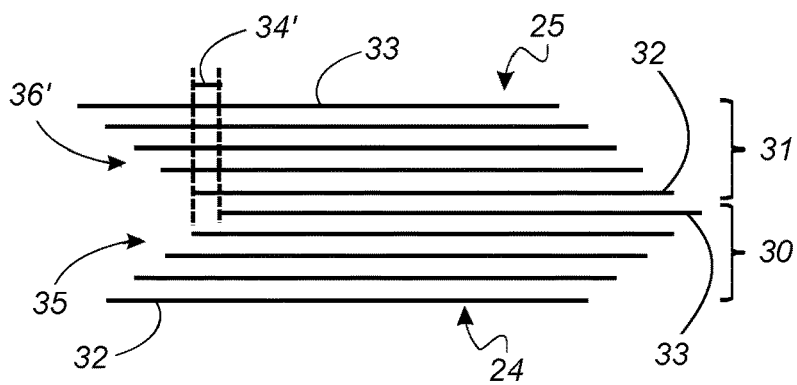
FIG. 8 shows a third embodiment of the first group and the second group.

FIG. 8 shows a third embodiment of the first group 30 and the second group 31, wherein the second outermost layer 33 of the first group 30 functions as a reference layer for offsetting the individual layers of the second group 31. All layers of the second group 31 are thereby be offset in the edgewise direction relative to the reference layer, as illustrated in FIG. 8.

Here, the first outermost layer 32 of the first group 30 functions as the reference layer for the other layers of the first group 30. Hence, a local width offset 34' exists between the two reference layers, as illustrated in FIG. 8.

Here, the first outermost layer 32 of the second group 31 only partly overlaps the second outermost layer 33 of the first group 30. Whereas in FIG. 7, the first outermost layer 32 of the second group 31 fully overlaps the second outermost layer 33 of the first group 30.

Figure 9:
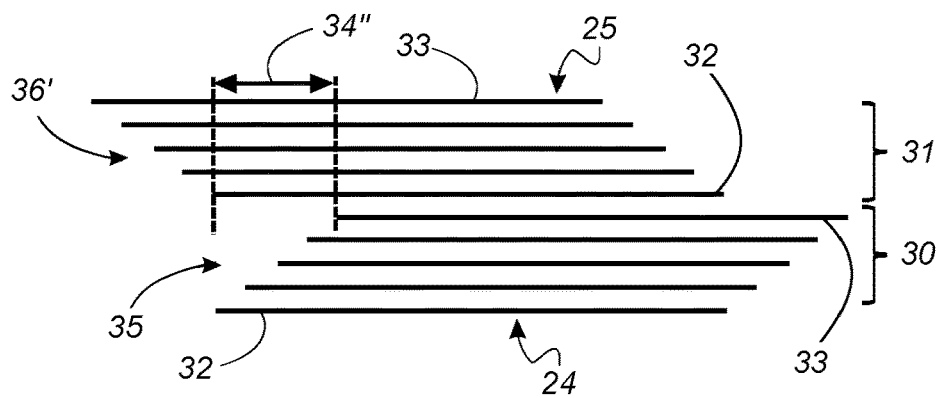
FIG. 9 shows a fourth embodiment of the first group and the second group.

FIG. 9 shows a fourth embodiment of the first group 30 and the second group 31, wherein the layers of the second group 31 are offset in an opposite edgewise direction relative to the layers of the first group 30.

The first outermost layer of the second group 31 functions as the reference layer for offsetting the other layers of the second group 31. Similarly, the first outermost layer of the first group 30 functions as the reference layer for offsetting the other layers of the first group 30. The two reference layers are here aligned in the thickness direction.

Here, a greater local width offset 34" exits between the second outermost layer 33 of the first group 30 and the first outermost layer of the second group 31. Thereby, further reducing the overlap between these two outermost layers 32, 33.

Figure 10:
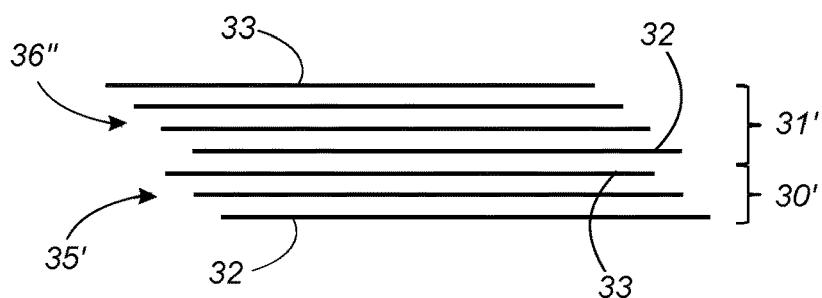
FIG. 10 shows a fifth embodiment of the first group and the second group.

FIG. 10 shows a fifth embodiment of the first group 30' and the second group 31', wherein the number of layers in the first group 30' differ from the number of the second group 31'. Here, the number of the layers in the first group 30' is smaller than the number of layers in the second group 31'.

Figure 11:
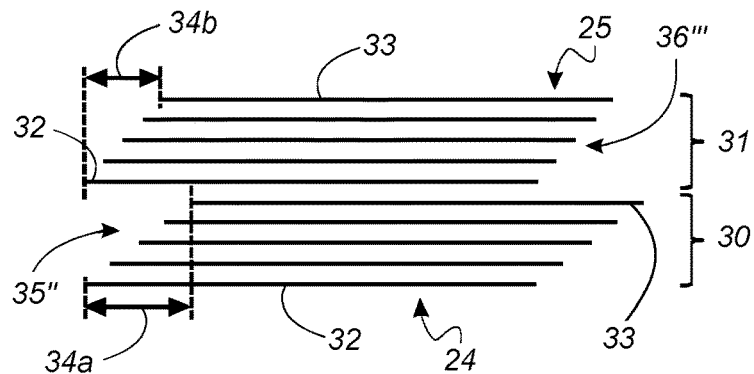
FIG. 11 shows a sixth embodiment of the first group and the second group.

Alternatively or additionally, the reference layer of the second group 31' is aligned with an intermediate layer of the first group 30'. The first outermost layer of the second group 31' thus partly overlaps the second outermost layer 33 of the first group 30'. FIG. 11 shows a sixth embodiment of the first group and the second group, wherein the local width offsets of the first group 30 differ from the local width offsets of the second group 31.

Here, the layers of the first group 30 have a first local width offset 34a measured relative to its reference layer. The layers of the first group 30 form a first edge profile 35" arranged in a first angular position relative to the thickness direction.

Similarly, the layers of the second group 31 have a second local width offset 34b measured relative to its reference layer. The layers of the second group 31 form a sec- and edge profile 36''' arranged in a second angular position relative to the thickness direction.

As indicated in FIG. 11, the first local width offset 34a is greater than the second local width offset 34b. This difference in width offsets results in the first and second edge profiles 35", 36''' being placed in different angular positions relative to the thickness direction. Whereas, the first and second groups 30, 31 of FIG. 6 have equal width offsets and thus the first and second edge profiles 35, 36 thereof are placed in parallel angular positions.

Figure 12:
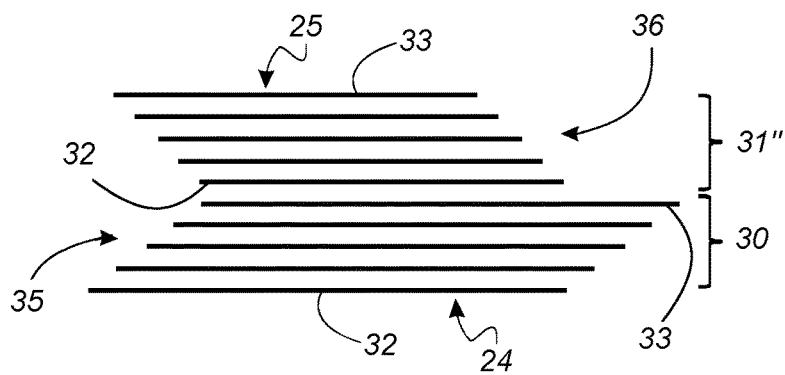
FIG. 12 shows a seventh embodiment of the first group and the second group.

FIG. 12 shows a seventh embodiment of the first group 30 and the second group 31", wherein the layers of the first group 30 and the layers of the second group 31" have different local widths.

Figure 17:
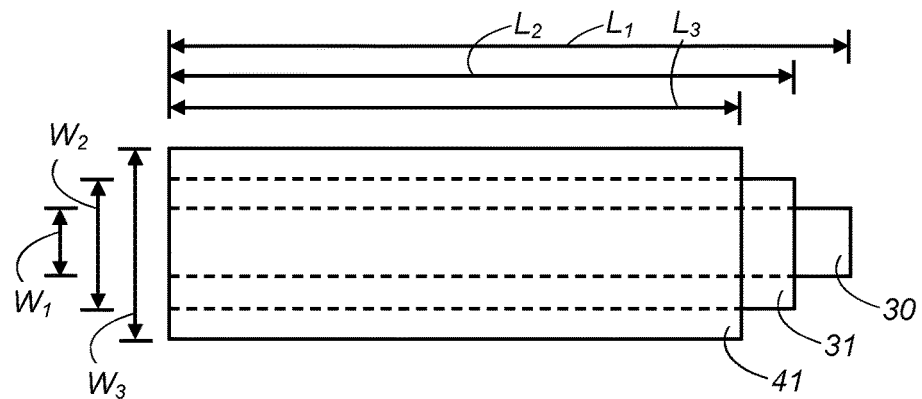
FIG. 17 shows a tenth embodiment of the wind turbine blade component.
Figure 18:
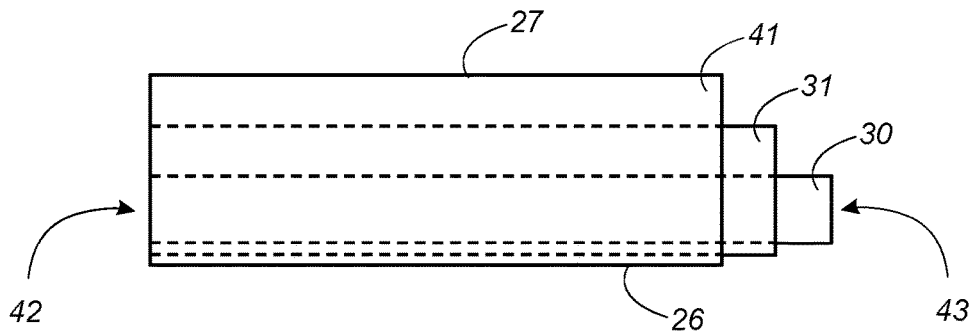
FIG. 18 shows an eleventh embodiment of the wind turbine blade component.

Here, all layers of the first group 30 have a first local width and all layers of the second group 31" have a second local width, as illustrated in FIG. 12 and further in FIGS. 17-18. Each group 30, 31" of layers are continuously offset in a selected edgewise direction to form the desired first and second edge profiles 35, 36. Whereas in conventional main laminates, the layers are individually cut into different widths to form the desired edge profiles, such as disclosed in US 2009/0169392 A1.

Figure 13:
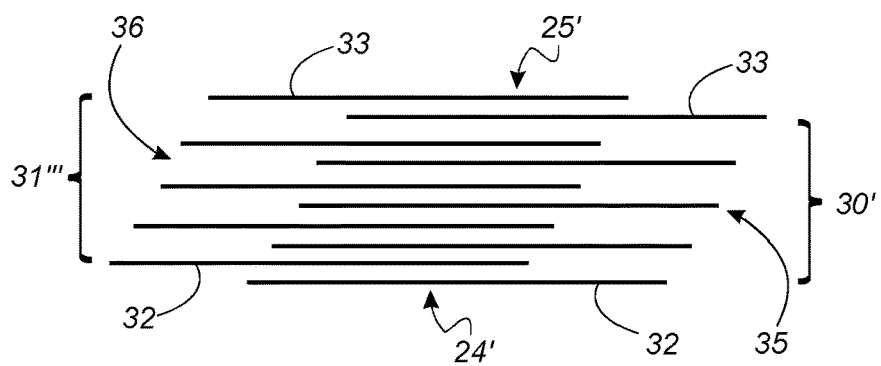
FIG. 13 shows an eighth embodiment of the stack where the first group of layers and the second group of layers are arranged in an alternating order.

FIG. 13 shows an eighth embodiment of the stack where the first group 30' of layers and the second group 31''' of layers are arranged in an alternating order. Here, the first outermost layer 32 of the second group 31''' is arranged on top of the first outermost layer 32 of the first group 30'. A subsequent layer of the first group 30' is arranged on top of the first outermost layer 32 of the second group 31'''. A subsequent layer of the second group 31''' is arranged on top of this subsequent layer of the first group 30', and so forth.

Here, the layers within the first and second groups 30', 31''' are offset in the same overall edgewise direction, preferably having equal local width offsets as illustrated in FIG. 6. The first group 30' of layers is further offset in the edgewise direction relative to the second group 31''' of layers, as illustrated, so the layers form partly overlapping layers.

Here, the first and second groups 30', 31''' form a stack with a parallelogram shaped cross-sectional profile. The total width of this stack is defined by the combined local widths of the partly overlapping layers. Further, the stack has a first side 24' defined by the combined first outermost layers 32 of the first and second groups 30', 31'''. The second side 25' is defined by the combined second outermost layers 33 of the first and second groups 30', 31'''. Here, the stack has a uniform overlap between corresponding layers of the first and second groups 30', 31''', as illustrated.

The stack may thus be formed using layers having a narrower width than the desired total width by simply offsetting the layers within the first and/or second group and further offsetting the respective groups relative to each other.

Figure 14:
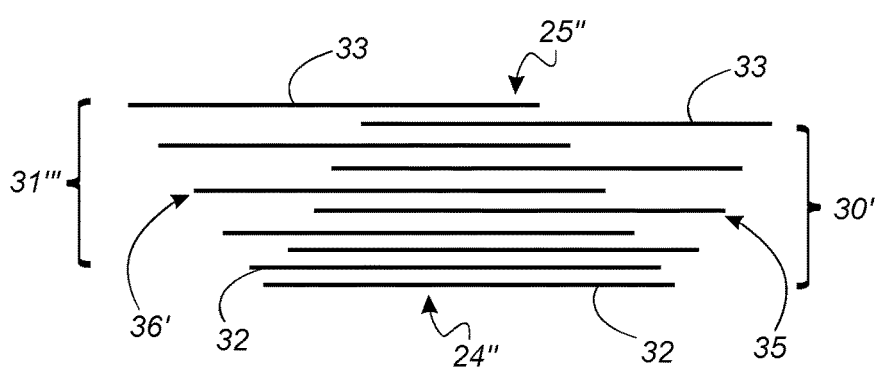
FIG. 14 shows a ninth embodiment of the first group and the second group.

FIG. 14 shows a ninth embodiment of the first group 30' and the second group 31''', wherein the second group 31''' of layers are offset in an opposite edgewise direction relative to the first group 30' of layers.

Here, the first and second groups 30', 31''' form a stack with a trapezoid shaped cross-sectional profile. The total width of this stack is defined by the combined local widths of the partly overlapping layers. Further, the stack has a first side 24" defined by the combined first outermost layers 32 of the first and second groups 30', 31'''. The second side 25" is defined by the combined second outermost layers 33 of the first and second groups 30', 31'''. Here, the stack has a minimum overlap between the second outermost layers 33 of the first and second groups 30', 31''' and a maximum overlap between the first outermost layers 32 of the first and second groups 30', 31'''.

The lowermost layer of this stack, e.g. the first outermost layer 32 of the first group 30', functions as the reference layer for offsetting the other layers of the stack, as illustrated in FIG. 14.

Here, the total width of the stack tapers from the second side 25" to the first side 24" in the thickness direction. However, the tapering direction may also be reversed so that the total width of the stack tapers from the first side 24" to the second side 25" in the thickness direction.

FIG. 15*a-b* show two alternative first embodiments of a wind turbine blade component formed as a main laminate 37, wherein both FIG. 15*a* and FIG. 15*b* show the main laminate 37 having an overall cross-sectional profile formed by a number of sub-parts 38 arranged relative to each other.

Here, the individual sub-parts 38 are arranged relative to each other in the thickness direction, as indicated in FIG. 15*a*. Optionally, the individual sub-parts 38 are arranged relative to each other in thickness direction and/or in the edgewise direction, as indicated in FIG. 15*b*. Alternatively or additionally, the individual sub-parts 38 may also be arranged relative to each other in the lengthwise direction (not shown).

The first and second groups 30, 31 of layers described in relation to FIGS. 6-14 form one sub-part of the main laminate 37.

Here, the first and second groups 30, 31 form one symmetrical half of the main laminate 37, as illustrated in FIG. 15*b*, while the other half 39 is formed by a transformed copy of the first and second groups 30, 31. The two halves are arranged relative to a central line 40. The central line 40 extends between the first and second edges or the first and second sides of the main laminate 37. Alternatively, the main laminate 37 comprises four symmetrical sub-parts, as illustrated in FIG. 15*b*. The first and second groups 30, 31 form one sub-part while the other three sub-parts 38' are formed by a transformed copy of the first and second groups 30, 31.

Here, the first and second groups 30, 31 form one sub-part where at least one other sub-part 38" is arranged relative to the first and second groups 30, 31. This sub-part 38" has a configuration that differs from the configuration of the first and second groups 30, 31, as illustrated in FIG. 15*a*. The sub-part 38" is formed by a third group of layers and a fourth group of layers arranged in a continuous order or in an alternating order, as illustrated in FIGS. 6 and 13. Here, a sub-part 38" is arranged on both the first and second sides 24, 25 of the first and second groups 30, 31.

Figure 16:
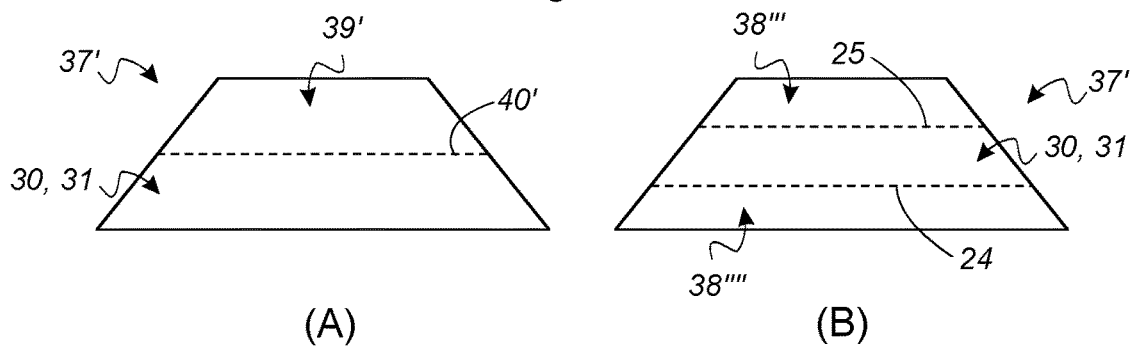
FIG. 16a-b show two alternative second embodiments of the wind turbine blade component formed by at least two sub-parts.

FIG. 16*a-b* show two alternative second embodiments of the wind turbine blade component, wherein the main laminate 37' has a different overall cross-sectional profile formed by the individual sub-parts 38.

The first and second groups 30, 31 of layers may form one half of the main laminate 37' while the other half 39' has the same overall configuration, but different dimensions, as illustrated in FIG. 16*a*. The other half 39' is formed by a third group of layers and a fourth group of layers arranged in a continuous order or in an alternating order. The two halves are arranged relative to a central line 40'.

Here, the layers of the third and fourth groups have a smaller local width than the local width of the first and second groups 30, 31 of layers. Thereby, forming a narrower profile that the layers of the first and second groups 30, 31. The other half 39' and the first and second groups 30, 31 of layers are arranged so that the total width of the main laminate 37' continuously tapers along the thickness of the main laminate 37'.

One sub-part 38''' is arranged at the second side 35 while another sub-part 38'''' is arranged at the first side 34 of the first and second groups 30, 31, as illustrated in FIG. 16*b*. Here, the layers of the groups forming said one sub-part 38''' have a smaller local width than the local width of the first and second groups 30, 31 of layers. Thus, the sub-part 38''' has a narrower profile that the layers of the first and second groups 30, 31. Here, the layers of the groups forming said another sub-part 38'''' have a greater local width than the local width of the first and second groups 30, 31 of layers. Thus, the sub-part 38'''' has a wider profile that the layers of the first and second groups 30, 31.

Figure 15:
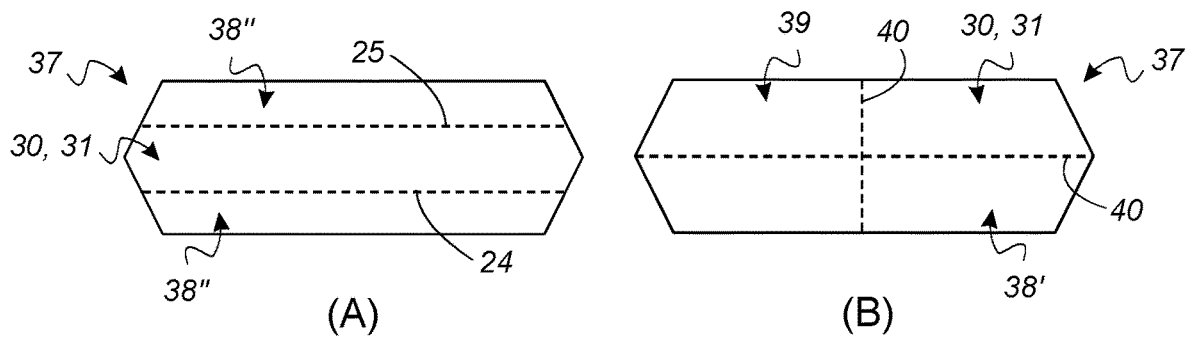
FIG. 15a-b show two alternative first embodiments of a wind turbine blade component formed by at least two sub-parts.

Similar to the sub-parts 38" of FIG. 15, the sub-parts 38''', 38'''' optionally has a relative thickness smaller than the relative thickness of the sub-part formed by the first and second groups 30, 31.

FIG. 17 shows a tenth embodiment of the wind turbine blade component, wherein the respective groups of layers have different local lengths and different local widths.

The layers of the first group 30 all have a first local length, $L_1$, while the layers of the second group 31 all have a second local length, $L_2$. Further, the layers of an optional third group 41 all have a third length, $L_3$. Here, the layers of the first and second groups 30, 31 of layers extend beyond the local length of the third group 41, thus the first and second lengths $L_1$, $L_2$ are greater than the third length $L_3$. Furthermore, the layers of the first group 30 of layers extend beyond the local length of the second group 31, thus the first length $L_1$ is greater than the second length $L_2$.

Further, the layers of the first group 30 all have a first local width, $W_1$, while the layers of the second group 31 all have a second local width, $W_2$. Further, the layers of an optional third group 41 all have a third width, $W_3$. Here, the layers of the second and third groups 31, 41 of layers extend beyond the local width of the first group 30, thus the second and third widths $W_2$, $W_3$ are greater than the first width $W_1$. Furthermore, the layers of the third group 41 of layers extend beyond the local width of the second group 31, thus the third width $W_3$ is greater than the second width $W_2$.

As illustrated in FIG. 17, the respective groups 30, 31, 41 are aligned centrally relative to a longitudinal central line (not shown) of the first group 30.

FIG. 18 shows an eleventh embodiment of the wind turbine blade component, wherein the respective groups of layers are offset towards the first or second edge 26, 27. Here, the first, second and third groups 30, 31, 41 are offset towards the first edge 26. Alternatively, the first, second and third groups 30, 31, 41 are offset towards the second edge 27.

In the embodiments of FIGS. 17 and 18, the first, second and third groups 30, 31, 41 are further be aligned relative to the first end 42, alternatively the second end 43. Alternatively, the first, second and third groups 30, 31, 41 may be aligned centrally relative to a central edgewise central line (not shown).

Figure 19:
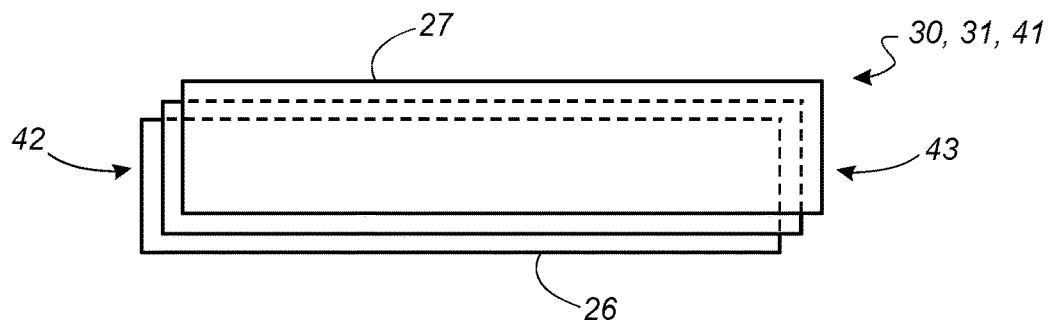
FIG. 19 shows a twelve embodiment of the wind turbine blade component.

FIG. 19 shows a twelve embodiment of the wind turbine blade component, wherein the individual layers of one group 30, 31, 41 are offset both in the lengthwise direction and in the edgewise direction. Thereby, forming a stack having a tapered profile in both the lengthwise and edgewise direction.

The individual layers may be continuously offset towards the second end 43 and the second edge 27. Alternatively, the individual layers may be offset towards the first end 42 and/or the first edge 26.

Figure 20:
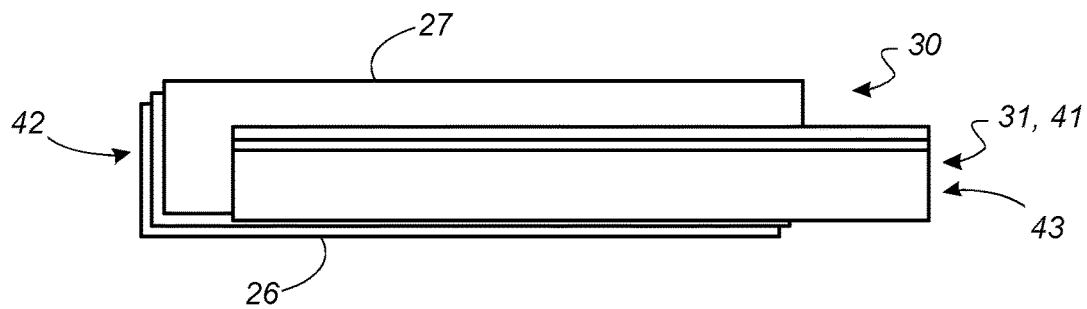
FIG. 20 shows a thirteenth embodiment of the wind turbine blade component.

FIG. 20 shows a thirteenth embodiment of the wind turbine blade component, wherein the individual layers of one group are offset in both the edgewise and lengthwise directions while the individual layers of another group are offset only in the edgewise direction.

Here, layers of the first group 30 are offset in both the edgewise and lengthwise directions while the layers of the second or third group, 31, 41 are offset only in the edgewise direction. Alternatively, the layers of the second or third group, 31, 41 may also be offset in both the edgewise and lengthwise directions, but offset differently than the layers of the first group 30.

Here, the layers of the first group 30 have a greater local width than of the layers of the second or third group 31, 41. However, the layers of the second or third group, 31, 41 may have the same local width as the layers of the first group 30.

Figure 21:
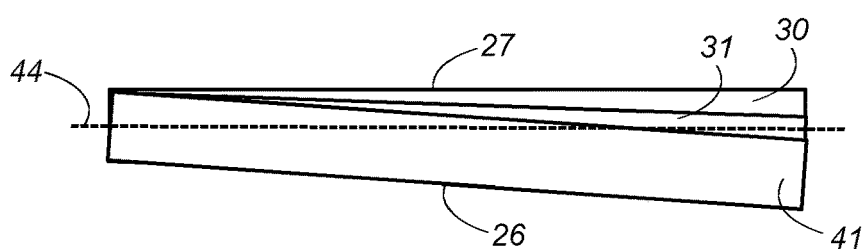
FIG. 21 shows a fourteenth embodiment of the wind turbine blade component.

FIG. 21 shows a fourteenth embodiment of the wind turbine blade component, wherein the respective groups 31, 41 are angular offset relative to the lengthwise direction 44. The layers of groups 31, 41 are angular offset towards the first edge 26, alternatively towards the second edge 27. The layers of the group 30 extend parallel to the lengthwise direction 44.

Here, the total width increases uniformly from the first end 42 to the second end 43.

Figure 22:
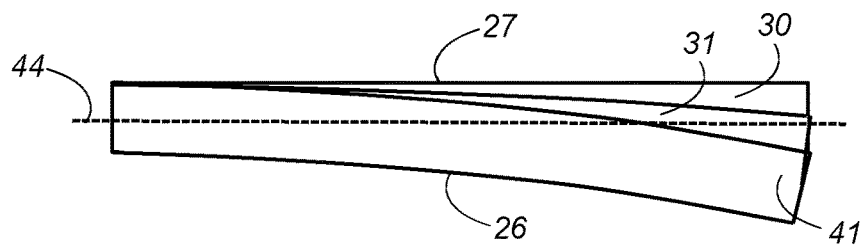
FIG. 22 shows a fifteenth embodiment of the wind turbine blade component.

FIG. 22 shows a fifteenth embodiment of the wind turbine blade component, wherein the respective groups 31, 41 extend in a curved direction towards the first edge 26, alternatively towards the second edge 27.

The layers of the group 30 extend parallel to the lengthwise direction 44. However, all layers of the groups 30, 31, 41 may extend in the same curved direction.

Alternatively or additionally, the individual layers within one group 30, 31, 41 may be arranged similarly to the embodiments shown in FIGS. 21 and 22.

The abovementioned embodiments may be combined in any combinations without deviating from the present invention.

The invention claimed is:

1. A wind turbine blade component for a wind turbine blade (5), the wind turbine blade component extending from a first end (42) to a second end (43) in a lengthwise direction and further from a first edge (26) to a second edge (27) in an edgewise direction, the wind turbine blade component comprises:
   a plurality of layers of fibre material arranged in a stack extending in a thickness direction, wherein the stack defines a first side (24) and a second side (25), wherein the first and second edges (26, 27) are arranged between the first and second sides (24, 25), and wherein said plurality of layers of fibre material comprises a first group (30) of layers and at least a second group (31) of layers,
   wherein each of the layers of said first group (30) has the same width equal to a first local width ($W_1$),
   wherein each of the layers of said second group (31) has the same width equal to a second local width ($W_2$),
   wherein the layers of at least one of said first and second groups (30, 31) are continuously offset in at least one edgewise direction from the first side (24) to the second side (25), where the layers of said first group (30) are offset in a first edgewise direction to form a first edge profile (35) and the layers of said second group (31) are offset in a second edgewise direction to form a second edge profile (36), and
   wherein the first edgewise direction is opposite of the second edgewise direction.

2. The wind turbine blade component according to claim 1, characterised in that an outermost layer (32, 33) of said first group (30) is aligned with an outermost layer (32, 33) of said second group (31) in the thickness direction.

3. The wind turbine blade component according to claim 1, characterised in that the layers of the second group (31) are offset relative to an outermost layer (32, 33) of the first group (30).

4. The wind turbine blade component according to claim 1, characterised in that the layers of at least the first group (30) or second group (31) are arranged in a continuous order in the thickness direction.

5. The wind turbine blade component according to claim 1, characterised in that the layers of the first group (30) and the layers of the second group (31) are arranged in an alternating order in the thickness direction.

6. The wind turbine blade component according to claim 1, characterised in that said plurality of layers form a tapered stack, wherein a total width of said tapered stack tapers from the first side (24) to the second side (25) or a total thickness of said tapered stack tapers from a layer defining one of said first and second sides (24, 25) to a layer defining the other of said first and second sides (24, 25).

7. The wind turbine blade component according to claim 1, characterised in that said first local width ($W_1$) is equal to said second local width ($W_2$).

8. The wind turbine blade component according to claim 7, characterised in that the layers of said first group (30) further have a first local length ($L_1$) and the layers of said second group (31) further have a second local length ($L_2$), wherein said first local length ($L_1$) is equal to said second local length ($L_2$).

9. The wind turbine blade component according to claim 1, wherein said first local width ($W_1$) differs from the second local width ($W_2$).

10. The wind turbine blade component according to claim 7, wherein the layers of said first group (30) further have a first local length ($L_1$) and the layers of said second group (31) further have a second local length ($L_2$), wherein said first local length ($L_1$) differs from the second local length ($L_2$).

11. The wind turbine blade component according to claim 9, wherein the layers of said first group (30) further have a first local length ($L_1$) and the layers of said second group (31) further have a second local length ($L_2$), wherein said first local length ($L_1$) is equal to the second local length ($L_2$).

12. The wind turbine blade component according to claim 9, wherein the layers of said first group (30) further have a first local length ($L_1$) and the layers of said second group (31) further have a second local length ($L_2$), wherein said first local length ($L_1$) differs from the second local length ($L_2$).

13. A method of manufacturing a wind turbine blade component according to claim 1, comprising the steps of:
   laying up a first group (30) of layers of a fibre material in a mould, wherein each layer of said first group (30) has a first local width ($W_1$);
   further laying up at least a second group (31) of layers of the fibre material, wherein each layer of said at least second group (31) has a second local width ($W_2$);
   infusing said fibre material with a resin; and substantially curing said resin to form a wind turbine blade component,
wherein the laying up of at least one of said first and second groups (30, 31) of layers comprises continuously offsetting subsequent layers of said at least one of the first and second groups (30, 31) of layers in one edgewise direction relative to a reference layer of said at least one of the first and second groups (30, 31) of layers.

14. The method according to claim 13, characterised in that at least one of said first and second groups (30, 31) of layers is laid up in a continuous step.

15. The method according to claim 13, characterised in that said first and second groups (30, 31) of layers are laid up in alternating order.

16. The method according to claim 13, characterised in that the layers of a group having the greatest local length of said stack and/or the smallest local width of said stack are laid up in an initial step.

17. The method according to claim 13, characterised in that at least one layer of said first group (30) or second group (31) is laid up in an inclined angle relative to the lengthwise direction of another layer of the first group (30) or second group (31), and/or at least one layer of said first group (30) or second group (31) is laid up in a curved direction relative to the lengthwise direction.

18. A wind turbine blade (5) for a wind turbine, extending from a blade root (7) to a tip end (8) in a longitudinal direction and further from a leading edge (9) to a trailing edge (10) in a chordwise direction, the wind turbine blade (5) comprises a blade shell (11) forming a pressure side (12) and a suction side (23) and a load carrying structure arranged between the pressure side (12) and the suction side (13), wherein said load carrying structure comprises at least one main laminate (23) located at the pressure side (12) and at least one main laminate (23) located at the suction side (13), wherein at least one of said main laminates (23) at the pressure and suction sides (12, 13) is configured according to claim 1.

* * * * *